United States Patent
Ma et al.

(10) Patent No.: US 7,912,142 B2
(45) Date of Patent: Mar. 22, 2011

(54) DOUBLE LAYER MAXIMUM RATIO COMBINING FOR AN OFDM RECEIVER WITH INTER-CARRIER-INTERFERENCE CANCELLING

(75) Inventors: Jun Ma, Irvine, CA (US); Nabil Yousef, Foothill Ranch, CA (US); Li Liu, Aliso Viejo, CA (US)

(73) Assignee: Newport Media, Inc., Lake Forest, CA (US)

( * ) Notice: Subject to any disclaimer, the term of this patent is extended or adjusted under 35 U.S.C. 154(b) by 532 days.

(21) Appl. No.: 12/062,650

(22) Filed: Apr. 4, 2008

(65) Prior Publication Data

US 2009/0252237 A1  Oct. 8, 2009

(51) Int. Cl.
*H04B 15/00* (2006.01)
(52) U.S. Cl. ......... 375/285; 375/267; 375/346; 375/347
(58) Field of Classification Search .............. 375/267, 375/285, 346–350; 370/206
See application file for complete search history.

(56) References Cited

U.S. PATENT DOCUMENTS

| | | | | |
|---|---|---|---|---|
| 6,922,549 B2 * | 7/2005 | Lyons et al. | ............... | 455/67.13 |
| 7,362,832 B2 * | 4/2008 | Yoshida | ........................ | 375/348 |
| 7,515,893 B2 * | 4/2009 | Lyons et al. | ............... | 455/277.2 |

* cited by examiner

*Primary Examiner* — Jean B Corrielus
(74) *Attorney, Agent, or Firm* — Rahman LLC

(57) ABSTRACT

An apparatus, method, and system for reducing a C/N in an OFDM receiver using diversity combining techniques in the presence of ICI, wherein the apparatus comprises an encoded data estimator adapted to estimate data received in the OFDM receiver; a pair of ICI estimators operatively connected to the encoded data estimator and adapted to calculate an inter-carrier-interference term of the data; and a pair of diversity combining equalizers adapted to compensate multi-path interference of the data, wherein a first one of the diversity combining equalizers is operatively connected to the encoded data estimator, and a second one of the diversity combining equalizers is operatively connected to the pair of ICI estimators. The diversity combining equalizer may comprise a MRC diversity combining equalizer. Preferably, the encoded data estimator, the pair of ICI estimators, and the pair of diversity combining equalizers are implemented on a DVB-T/H diversity SoC.

20 Claims, 9 Drawing Sheets

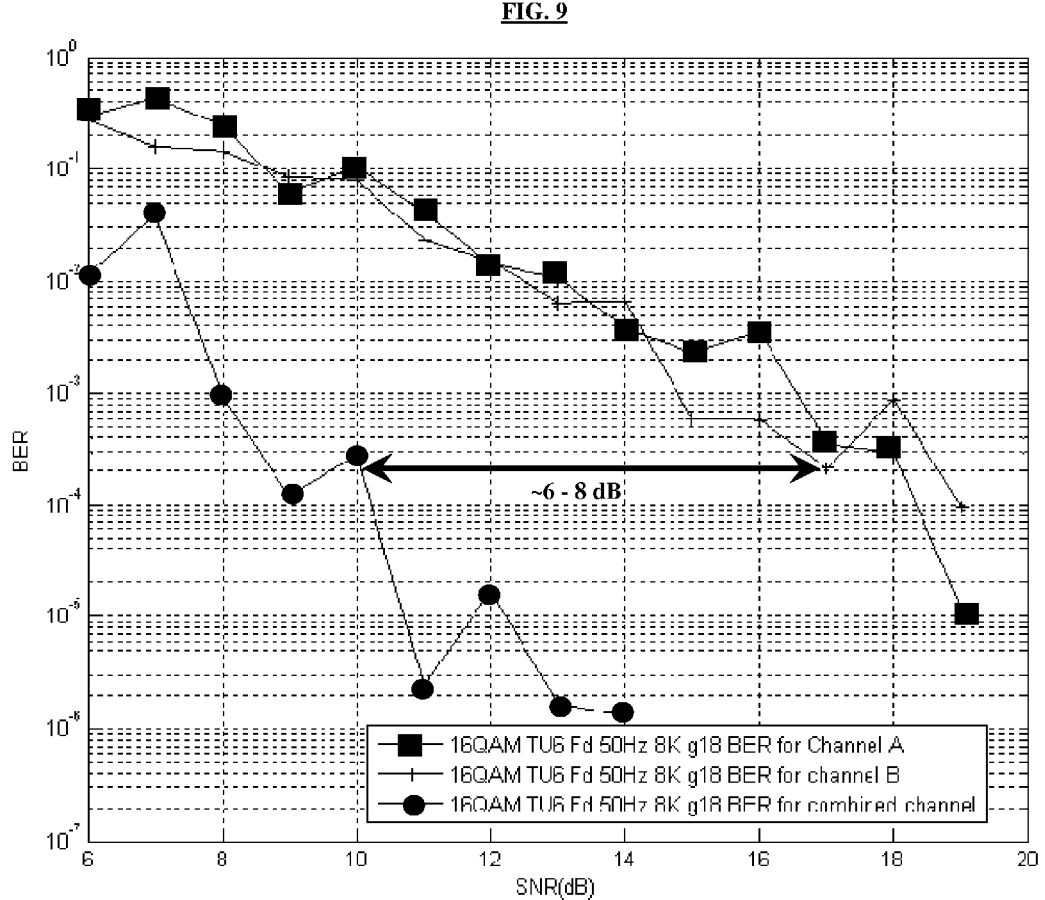

DOUBLE LAYER MAXIMUM RATIO COMBINING FOR AN OFDM RECEIVER WITH INTER-CARRIER-INTERFERENCE CANCELLING

BACKGROUND

1. Technical Field

The embodiments herein generally relate to communication systems and, more particularly to orthogonal frequency division multiplexing (OFDM) based digital communications.

2. Description of the Related Art

In OFDM based digital communications, such as digital video broadcasting terrestrial/hand held devices (DVB-T/H), diversity combining techniques are used to improve carrier-to-noise ratio (C/N) performance (about 3 to 9 dB) in static to slow varying channel conditions and/or Doppler frequency (twice) in mobile channel condition. They also suppress part of ingress noise and short echo problems, thus offering significant reception performance improvement with portable and mobile reception in places where a single receiver would not function. In the presence of time-varying Doppler fading channels, inter-carrier-interference (ICI) destroys OFDM carrier orthogonality and degrades system performance. Inter-carrier-interference canceling techniques can be applied to restore OFDM carrier orthogonality.

SUMMARY

In view of the foregoing, the embodiments herein provide an apparatus for reducing a C/N in an OFDM receiver using diversity combining techniques in the presence of ICI, wherein the apparatus comprises an encoded data estimator adapted to estimate data received in the OFDM receiver; a pair of ICI estimators operatively connected to the encoded data estimator and adapted to calculate an inter-carrier-interference term of the data; and a pair of diversity combining equalizers adapted to compensate multi-path interference of the data, wherein a first one of the diversity combining equalizers is operatively connected to the encoded data estimator, and a second one of the diversity combining equalizers is operatively connected to the pair of ICI estimators. The diversity combining equalizer may comprise a maximal ratio combining (MRC) diversity combining equalizer. Preferably, the encoded data estimator, the pair of ICI estimators, and the pair of diversity combining equalizers are implemented on a DVB-T/H diversity system on chip (SoC).

Preferably, the encoded data estimator, the pair of ICI estimators, and the pair of diversity combining equalizers provide a gain of 2-4 dB for an Additive White Gaussian Noise (AWGN) channel with Quadrature Phase Shift Keying (QPSK) modulation. Moreover, the encoded data estimator, the pair of ICI estimators, and the pair of diversity combining equalizers preferably provide a gain of 2-4 dB for an AWGN channel with 16-Quadrature Amplitude Modulation (16-QAM). Also, the encoded data estimator, the pair of ICI estimators, and the pair of diversity combining equalizers preferably provide a gain of 5.5-8 dB for a six path Typical Urban (TU6) Doppler channel with a 50 Hz Doppler frequency and 16-QAM. Furthermore, the data is received in two signal paths.

Another embodiment provides a method of reducing a C/N in an OFDM receiver using diversity combining techniques in the presence of ICI, wherein the method comprises receiving transmitted data from at least two channels; performing a first diversity combining equalization for data received using a first diversity combining equalizer; estimating data received at the receiver; calculating ICI estimates for data received from the at least two channels; calculating ICI terms by subtracting the received data with the corresponding calculated ICI estimate; and performing a second diversity combining equalization of the ICI subtracted data using a second diversity combining equalizer. Preferably, the diversity combining techniques comprises MRC.

Moreover, the method may further comprise performing the method on a DVB-T/H diversity SoC. Preferably, the performing of the second diversity combining equalization provides a gain of 2-4 dB for an AWGN channel with QPSK modulation. Furthermore, the performing of the second diversity combining equalization preferably provides a gain of 2-4 dB for an AWGN channel with 16-QAM. Also, the performing of the second diversity combining equalization preferably provides a gain of 5.5-8 dB for a six path TU6 Doppler channel with a 50 Hz Doppler frequency and 16-QAM. Preferably, the data is received in two signal paths.

Another embodiment provides a system for reducing a C/N in an OFDM receiver using diversity combining techniques in the presence of ICI, wherein the system comprises means for receiving transmitted data from at least two channels; means for performing a first diversity combining equalization for data received; means for estimating data received at the receiver; means for calculating ICI estimates for data received from the at least two channels; means for calculating ICI terms by subtracting the received data with the corresponding calculated ICI estimate; and means for performing a second diversity combining equalization of the ICI subtracted data. Preferably, the diversity combining techniques comprises MRC.

The means for performing of the second diversity combining equalization preferably provides a gain of 2-4 dB for an AWGN channel with QPSK modulation. Moreover, the means for performing of the second diversity combining equalization preferably provides a gain of 2-4 dB for an AWGN channel with 16-QAM. Additionally, the means for performing of the second diversity combining equalization preferably provides a gain of 5.5-8 dB for a six path TU6 Doppler channel with a 50 Hz Doppler frequency and 16-QAM. Also, the means for calculating ICI estimates preferably comprises a pair of ICI estimators.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 9 is a graph showing C/N performance of the double layer diversity combining equalizer with ICI canceling for a TU6 channel with 64-QAM.

DETAILED DESCRIPTION OF PREFERRED EMBODIMENTS

Figure 1:
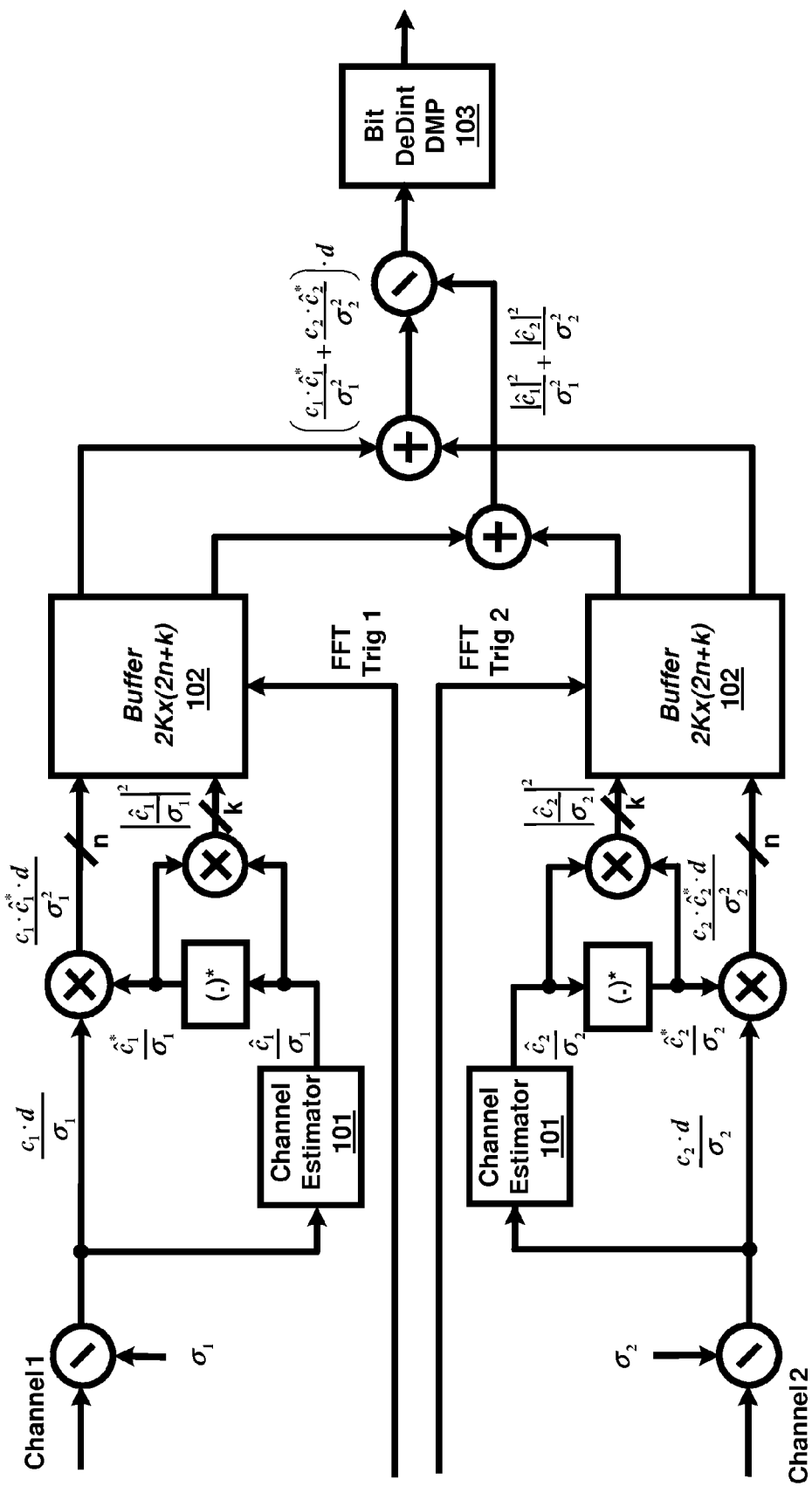
FIG. 1 shows a block diagram of a MRC diversity combining equalizer.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an improvement in C/N performance in the presence of ICI by providing a double layer diversity combining equalizer with ICI canceling. Referring now to the drawings, and more particularly to FIGS. 1 through 9, where similar reference characters denote corresponding features consistently throughout the figures, there are shown preferred embodiments.

The basic principle of diversity combining is that if one signal path fades, another independent path may be strong. If the two paths can be combined in an efficient way, the overall system performance will be improved. Several combining techniques can be employed, namely, selection diversity combining, equal gain combining, and MRC. MRC combines the two independent paths according to their respective signal-to-noise ratio (SNR) and maximizes the combined output SNR. Multiple paths can be combined using MRC. The embodiments herein have been described in terms of combining two signal paths using MRC; those skilled in the art will recognize that the embodiments herein can be applied to combining multiple signal paths as well.

Let signals received from two independent channels be $r_1$, $r_2$, where:

$$r_1 = c_1 \cdot d \quad r_2 = c_2 \cdot d \tag{1}$$

where $c_1$ and $c_2$ are channel gains on the respective signal paths, and d is the desired transmitted signal.

The diversity combiner output, r using MRC can be described as:

$$r = \frac{\hat{c}_1^*}{\sigma_1^2} \cdot r_1 + \frac{\hat{c}_2^*}{\sigma_2^2} \cdot r_2 \tag{2}$$

where $\hat{c}_1$ and $\hat{c}_2$ are estimated channel gains on respective signal paths, since true channel gains are usually unknown to receiver. Here, $\sigma_1$ and $\sigma_2$ are the noise standard derivation of respective signal paths. Let $SNR_1$ and $SNR_2$ be the signal to noise ratios of respective signal paths.

Substituting equation (1) into equation (2), the following holds:

$$r = \left( \frac{\hat{c}_1^* \cdot c_1}{\sigma_1^2} + \frac{\hat{c}_2^* \cdot c_2}{\sigma_2^2} \right) \cdot d \tag{3}$$

Estimated data signal after diversity combining equalization can then be obtained as:

$$\hat{d} = \frac{\frac{\hat{c}_1^* \cdot c_1}{\sigma_1^2} + \frac{\hat{c}_2^* \cdot c_2}{\sigma_2^2}}{\frac{|\hat{c}_1^*|}{\sigma_1^2} + \frac{|\hat{c}_2^*|}{\sigma_2^2}} \cdot d \tag{4}$$

where the denominator of equation (4) is a constant. If the estimated channel gains equal to true channel gains; i.e., $$\hat{c}_1 = c_1, \hat{c}_2 = c_2 \tag{5}$$

then, equation (4) reduces to:

$$\hat{d} = d \tag{6}$$

i.e., the diversity combining equalized data has become the true data.

FIG. 1 shows a block diagram of a MRC diversity combining equalizer. The equalizer combines two independent channels after assigning weights to channels based on SNR of respective channels. FIG. 1 realizes the function of equation (4). The channel estimator 101 obtains an estimate of the channel information based on the pilots in the frequency domain. The function of the buffer 102 is to align the two channels. Since the data coming into the two channels are independent though coming from the same source, the bits to be added after buffers 102 might not be corresponding to the same OFDM symbol bin, which they should be. The buffer 102 is inserted such that the two channels are appropriately delayed by adjusting the FFT trigger point so that the two channels are aligned when adding together after instance buffer 102. In practical implementation, usually one buffer 102 either in channel 1 or channel 2 is needed. Bit DeDint DMP 103 is the function block in the receiver chain after the equalizer to de-interleave the bit-stream and de-map the equalized bit-stream to soft-decision for Viterbi decoding purpose. The rest of the logics in FIG. 1 realize the function of equation (4).

Figure 2:
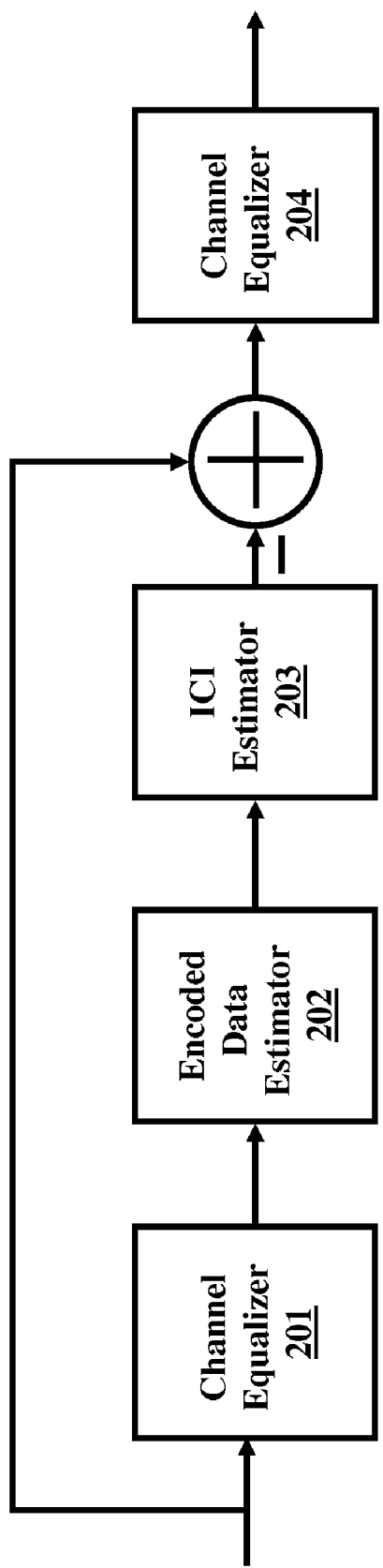
FIG. 2 is a block diagram of an ICI canceling technique.

In the presence of a time-varying fading channel, OFDM carriers lose orthogonality and thus cause noise like ICI. ICI canceling techniques are employed to reduce ICI noise. FIG. 2 shows a block diagram of an OFDM ICI canceling technique, where after channel equalization 201 and encoded data estimation 202, an ICI estimator 203 estimates the ICI term in the input data. Then, the ICI term is subtracted from the input data, and the ICI cancelled data is equalized by an equalizer 204. Channel equalization 201 removes the channel information from the received data. Then, the encoded data estimation 202 uses the equalized data to provide an estimate of the transmitted data information. Next, the ICI estimator 203 takes the estimated transmitted data information to provide an estimate of the ICI noise. This noise is then subtracted from the original received data and subsequently a channel equalizer 204 is used to equalize the ICI noise removed data stream.

Figure 3:
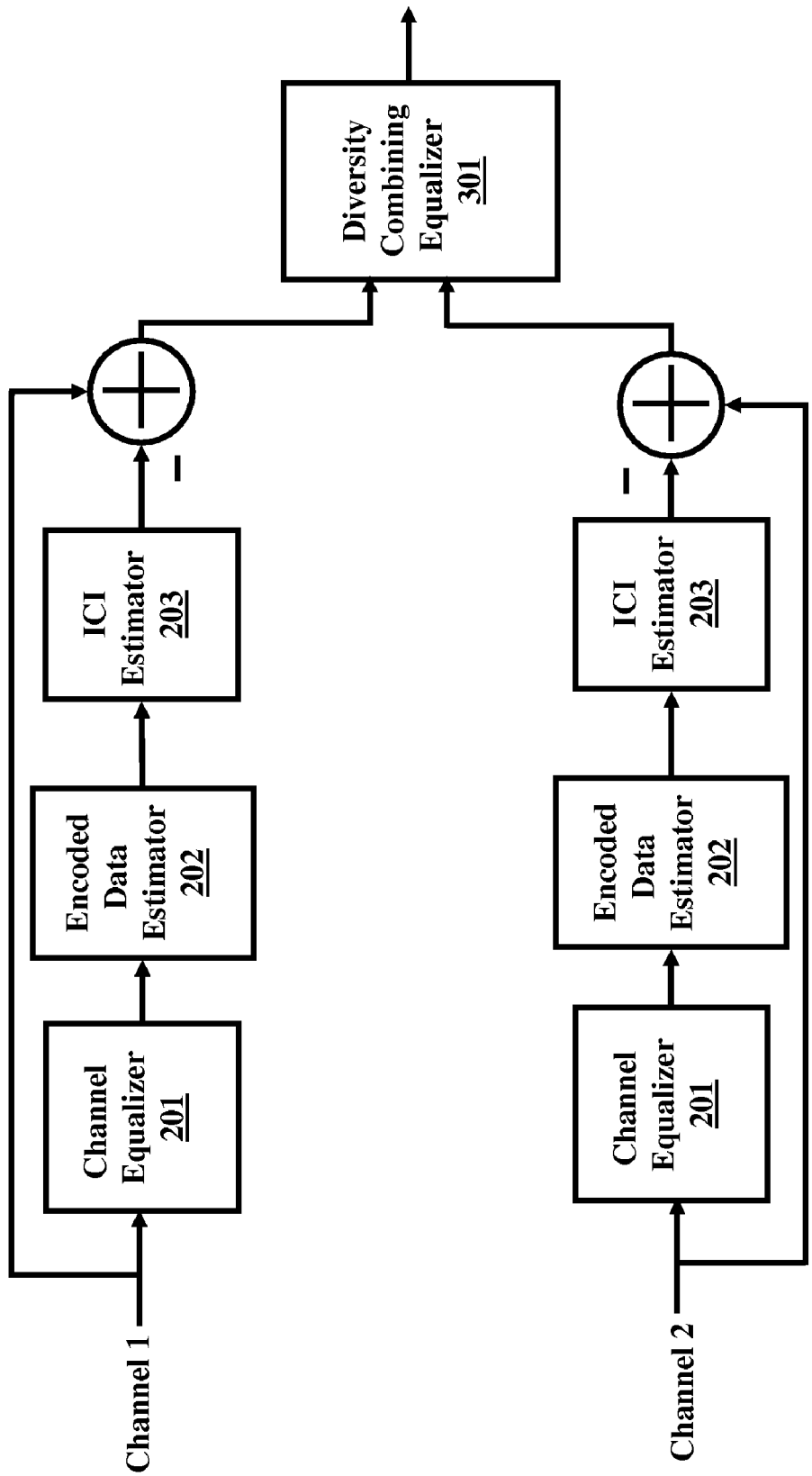
FIG. 3 shows a block diagram of a diversity combining equalizer.

FIG. 3 shows a diversity combining equalizer block diagram in the presence of ICI cancellation, where channel equalization is needed for each of the two independent signal paths. FIG. 3, with reference to FIGS. 1 and 2, achieves diversity combining with ICI cancellation. The ICI noise in the channels 1 and 2 are first cancelled based on the architecture in FIG. 2 and the ICI noises removed data streams from the channels 1 and 2 are then combined based on the architecture in FIG. 1.

Figure 4:
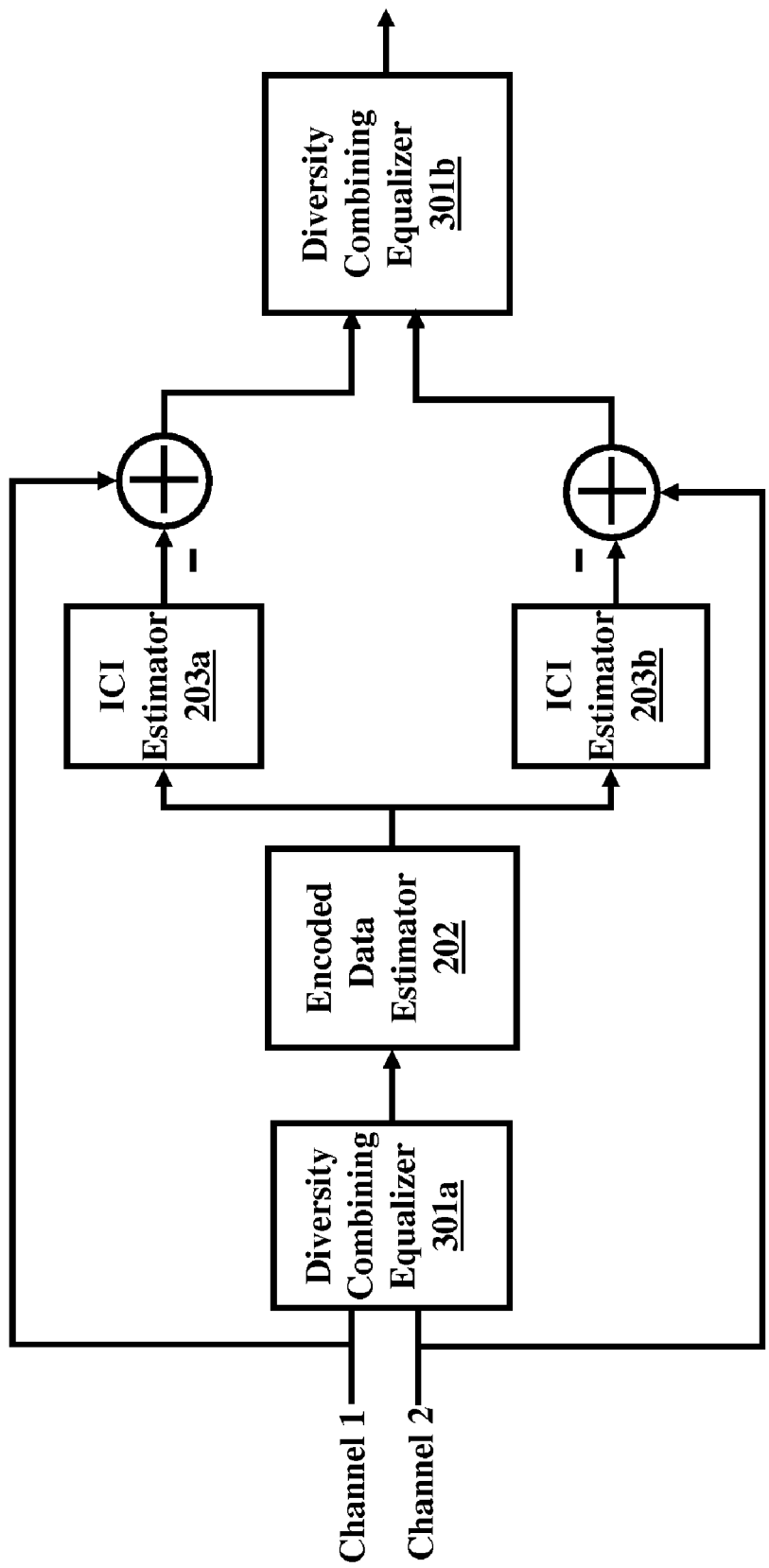
FIG. 4 shows a block diagram of double layer diversity combining equalizer with ICI canceling according to embodiments herein.

FIG. 4 is a block diagram of a double layer diversity combining equalizer with ICI cancellation, where channel equalizers 201 of FIG. 3 are replaced by a diversity combining equalizer 301a. The diversity combining equalizer 301a combines two or more independent channels (Channel 1 and Channel 2) after assigning weights to channels based on the SNR of the respective channels. The ICI estimator 203 estimates the ICI term in data from the equalizer 301a, the ICI term is subtracted from the input, and the ICI cancelled data is equalized by a second diversity combining equalizer 301b. The embodiments herein provide a 1 dB gain, as compared to the system shown in FIG. 3 for a Gaussian channel. The double layer diversity combining equalizer in FIG. 4 performs a similar function as the one shown in FIG. 3, but has enhanced performance gain. The difference is in the ICI noise removing blocks. Instead of independently equalizing and estimating the transmitted data information in channels 1 and 2 as shown in FIG. 3, in FIG. 4, the equalization 301a is achieved through a diversity combining equalization as shown in FIG. 1, then an encoded data estimator 202 is used to estimate the transmitted data for both channels 1 and 2 and feed the estimated transmitted data into two independent ICI noise estimator 203a, 203b. The ICI noises of channels 1 and 2 are then subtracted from the channels 1 and 2 and a second diversity combining equalizer 301b with the same architecture as shown in FIG. 1 is applied to obtain the final equalized data.

Figure 5:
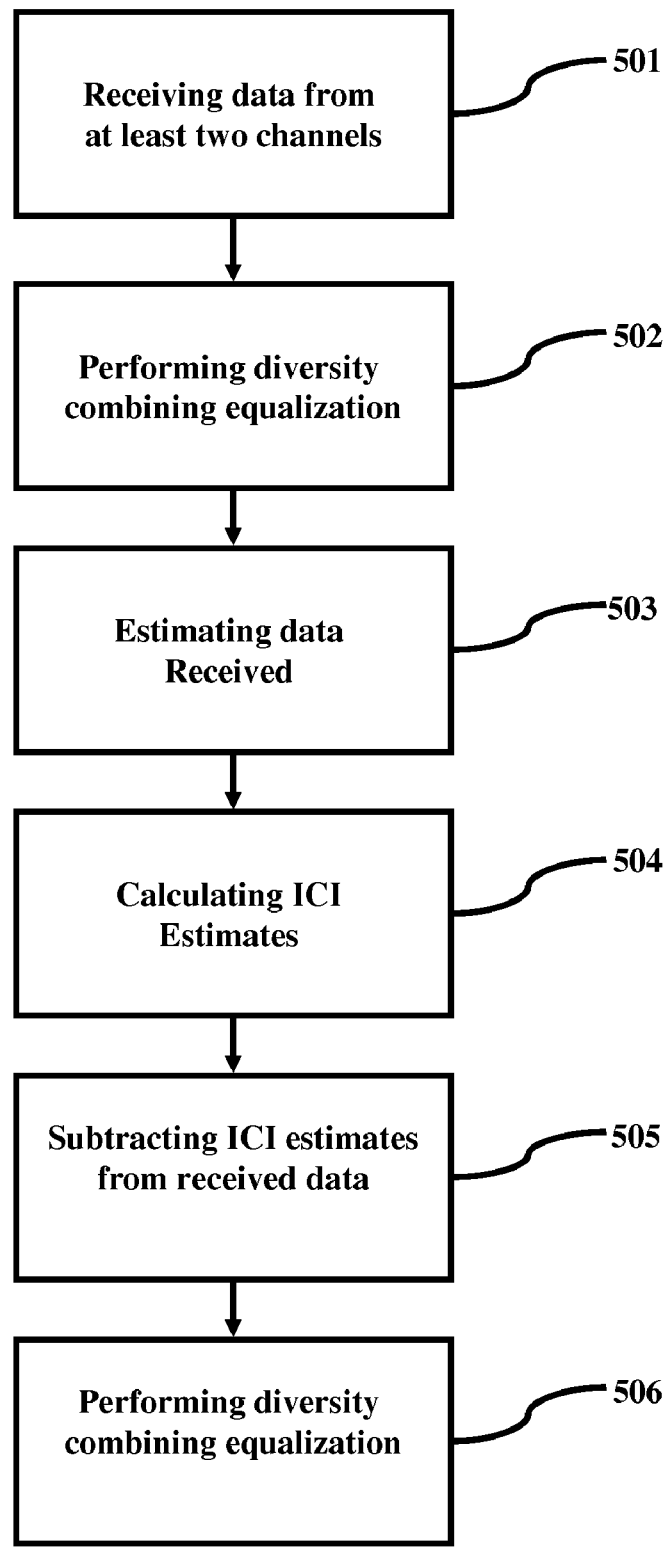
FIG. 5 is a flow diagram according to an embodiment herein.

FIG. 5, with reference to FIGS. 1 through 4, is a flowchart according to an embodiment described herein. A diversity combining equalizer 301 performs (502) diversity combining equalization on data received from at least two channels (Channel 1 and Channel 2) received (501) by an OFDM receiver (not shown). Once data is estimated (503), ICI estimates are calculated (504). Further, the ICI estimates are subtracted (505) from the received data, and diversity combining equalization is once again performed (506) on the ICI subtracted data.

Figure 6:
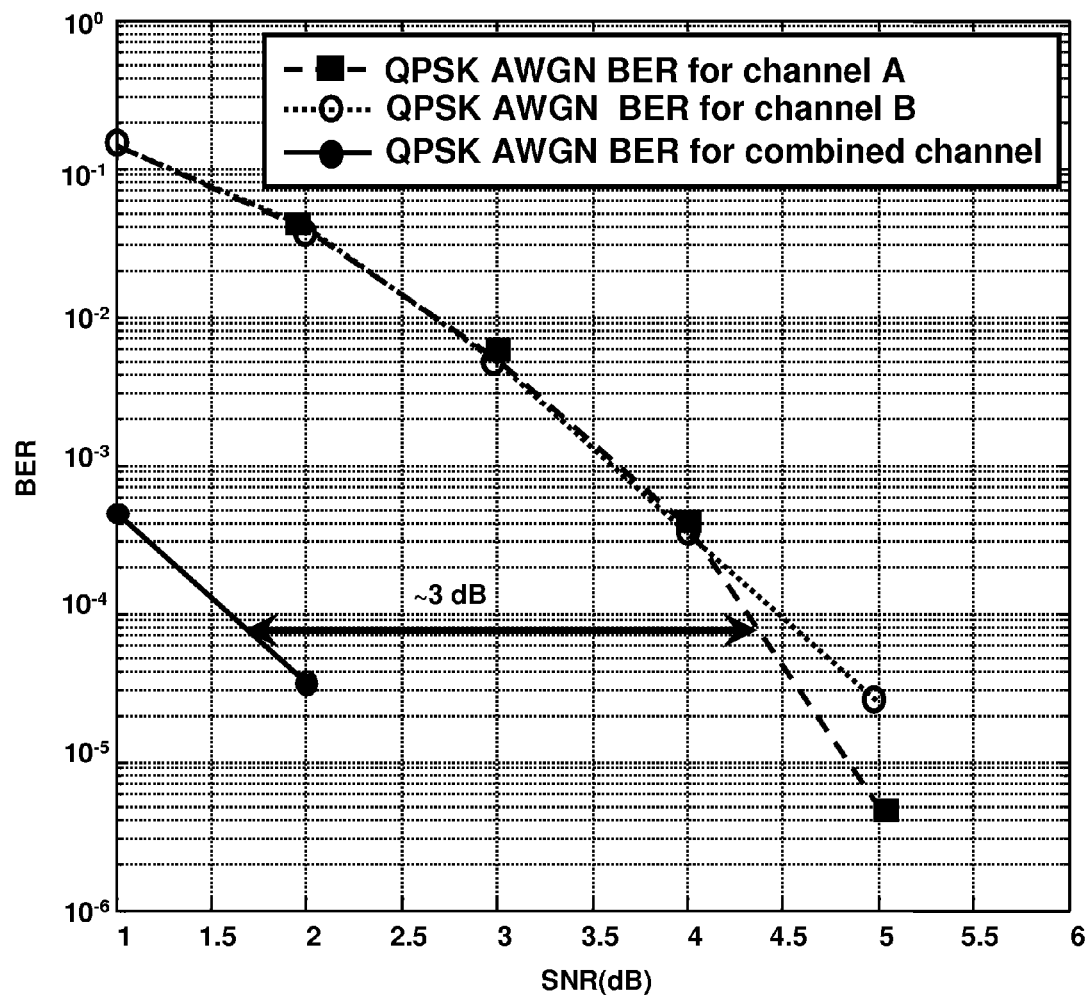
FIG. 6 is a graph showing C/N performance of the double layer diversity combining equalizer with ICI canceling with 4-QAM.
Figure 7:
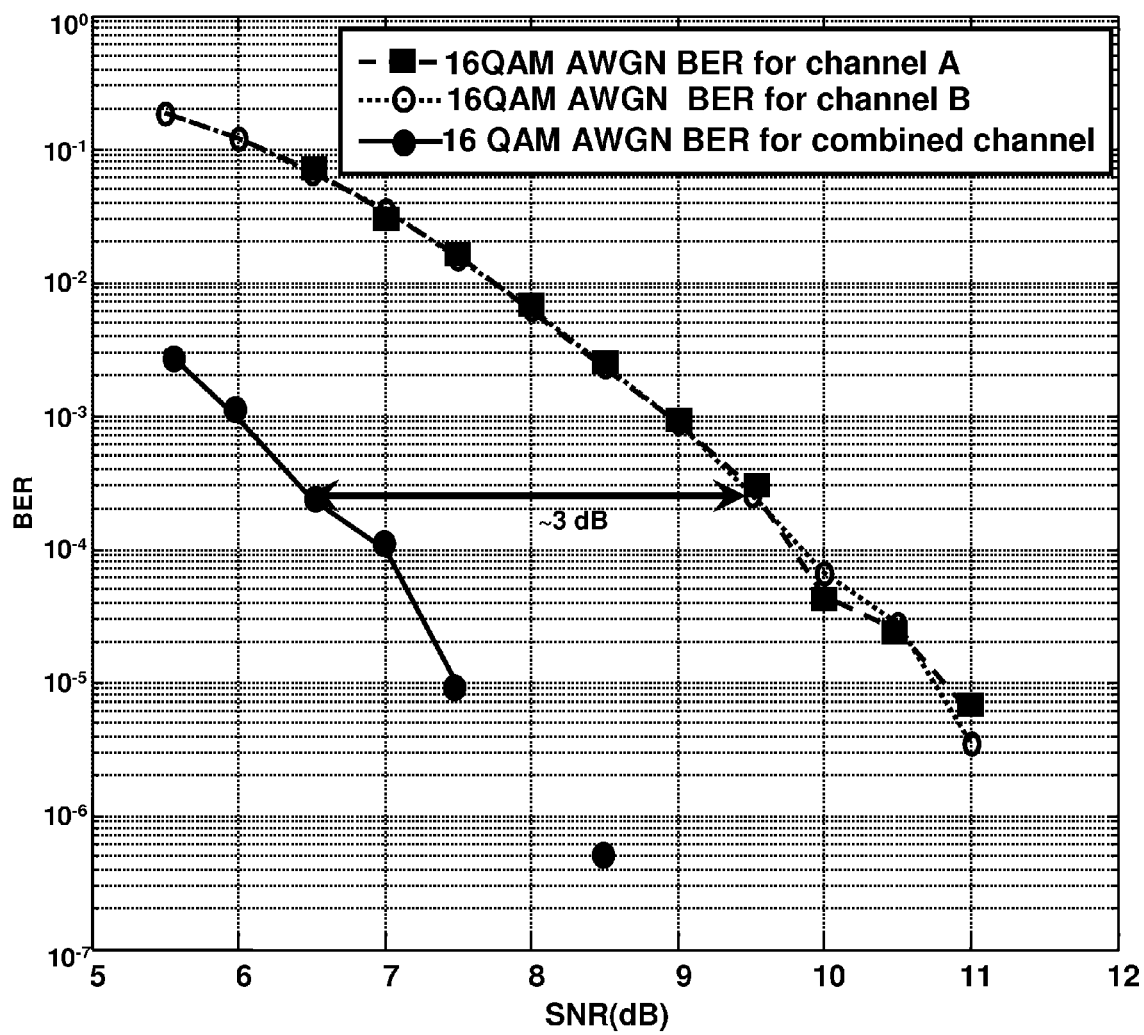
FIG. 7 is a graph showing C/N performance of the double layer diversity combining equalizer with ICI canceling with 16-QAM.
Figure 8:
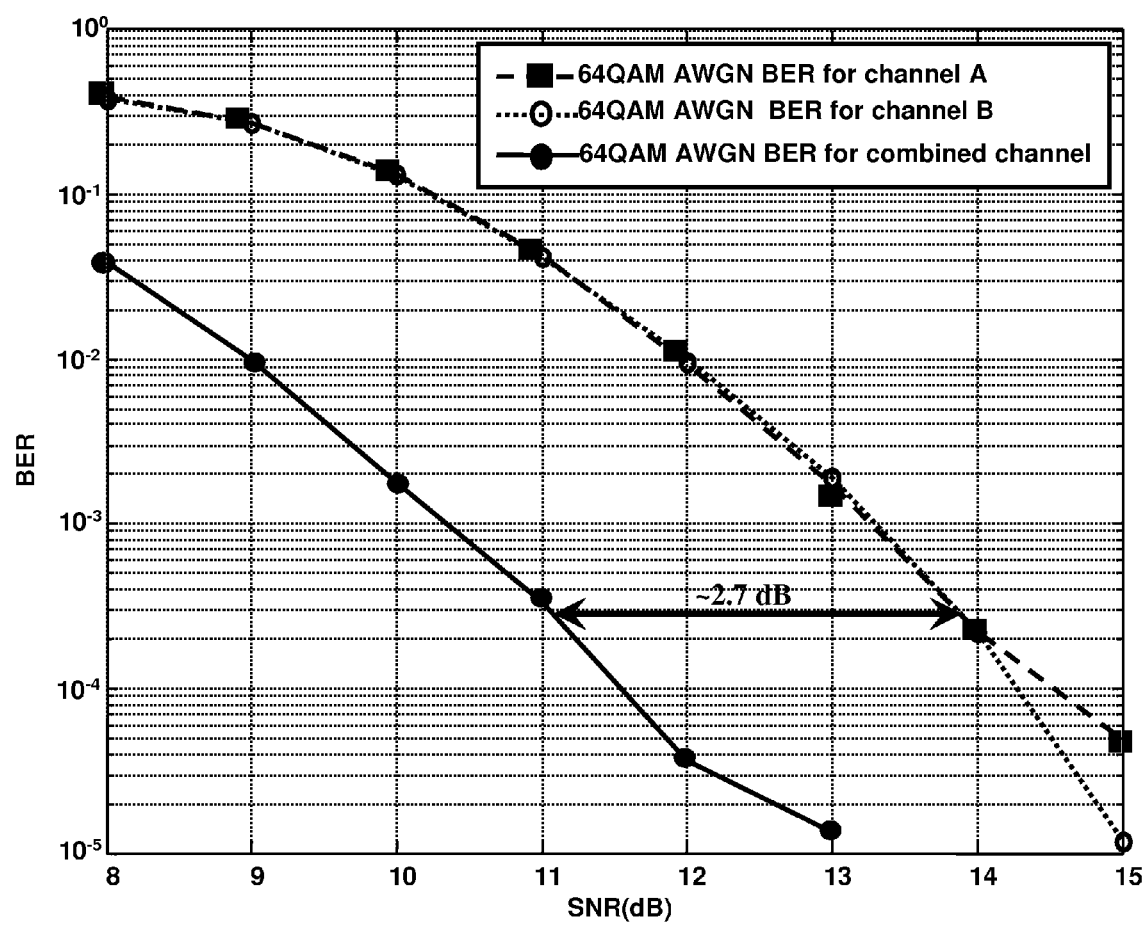
FIG. 8 is a graph showing C/N performance of the double layer diversity combining equalizer with ICI canceling for AWGN channel with 64-QAM.

FIGS. 6 through 8 graphically illustrate the C/N performance of the embodiments herein for a AWGN channel with QPSK modulation, 16-QAM modulation, and 64-QAM modulation, respectively, where the graphs are based on a model for application of digital video broadcasting over terrestrial handheld (DVB-T/H) devices. As seen from FIGS. 6 through 8, for an AWGN channel, the embodiments herein provide approximately a 3 dB gain (2.7 dB gain for 64-QAM modulation) for a post Viterbi decoder bit error rate (BER) of $2 \times 10^{-4}$.

FIG. 9 illustrates the gain of the embodiments herein as compared to a non-diversity receiver in presence of Doppler channel with Doppler frequency 50 Hz and 16-QAM modulation, with a six path typical urban (TU6) channel profile. The embodiments herein provide a gain in the range of 6 to 8 dB in terms of C/N for a post Viterbi decoder bit error rate (BER) of $2 \times 10^{-4}$.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for reducing a carrier-to-noise ratio (C/N) in an orthogonal frequency division multiplexing (OFDM) receiver using diversity combining techniques in the presence of inter-carrier-interference (ICI), said apparatus comprising:
    an encoded data estimator that estimates data received in said OFDM receiver;
    a pair of ICI estimators operatively connected to said encoded data estimator, wherein said pair of ICI estimators calculate an inter-carrier-interference term of said data;
    a pair of diversity combining equalizers that compensate multi-path interference of said data, wherein a first one of said diversity combining equalizers is operatively connected to said encoded data estimator, and a second one of said diversity combining equalizers is operatively connected to said pair of ICI estimators; and
    at least one processor operatively connected to said OFDM receiver, wherein said at least one processor processes said data.

2. The apparatus of claim claim 1, where each of said diversity combining equalizers comprises a maximal ratio combining (MRC) diversity combining equalizer.

3. The apparatus of claim 1, wherein said encoded data estimator, said pair of ICI estimators, and said pair of diversity combining equalizers are implemented on a digital video broadcasting over terrestrial handheld (DVB-T/H) diversity system on chip (SoC).

4. The apparatus of claim 1, wherein said encoded data estimator, said pair of ICI estimators, and said pair of diversity combining equalizers provide a gain of 2-4 dB for an Additive White Gaussian Noise (AWGN) channel with Quadrature Phase Shift Keying (QPSK) modulation.

5. The apparatus of claim 1, wherein said encoded data estimator, said pair of ICI estimators, and said pair of diversity combining equalizers provide a gain of 2-4 dB for an Additive White Gaussian Noise (AWGN) channel with 16-Quadrature Amplitude Modulation (16-QAM).

6. The apparatus of claim 1, wherein said encoded data estimator, said pair of ICI estimators, and said pair of diversity combining equalizers provide a gain of 5.5-8 dB for a six path Typical Urban (TU6) Doppler channel with a 50 Hz Doppler frequency and 16-Quadrature Amplitude Modulation (16-QAM).

7. The apparatus of claim 1, wherein said data is received in two signal paths.

8. A method of reducing a carrier-to-noise ratio (C/N) in an orthogonal frequency division multiplexing (OFDM) receiver using diversity combining techniques in the presence of inter-carrier-interference (ICI), said method comprising:
    receiving, by the receiver, data from at least two channels;
    performing a first diversity combining equalization for said data using a first diversity combining equalizer;
    estimating, using an estimator, said data received from said first diversity combining equalizer;
    calculating ICI estimates for said data received from said estimator;
    calculating ICI terms by subtracting said data, received at said receiver from said at least two channels, from the calculated ICI estimates for said data to generate respective ICI subtracted data; and
    performing a second diversity combining equalization of said respective ICI subtracted data using a second diversity combining equalizer.

9. The method of claim 8, wherein said diversity combining techniques comprises maximal ratio combining (MRC).

10. The method of claim 8, further comprising performing said method on a digital video broadcasting over terrestrial handheld (DVB-T/H) diversity system on chip (SoC).

11. The method of claim 8, wherein said performing of said second diversity combining equalization provides a gain of 2-4 dB for an Additive White Gaussian Noise (AWGN) channel with Quadrature Phase Shift Keying (QPSK) modulation.

12. The method of claim 8, wherein said performing of said second diversity combining equalization provides a gain of 2-4 dB for an Additive White Gaussian Noise (AWGN) channel with 16-Quadrature Amplitude Modulation (16-QAM).

13. The method of claim 8, wherein said performing of said second diversity combining equalization provides a gain of 5.5-8 dB for a six path Typical Urban (TU6) Doppler channel with a 50 Hz Doppler frequency and 16-Quadrature Amplitude Modulation (16-QAM).

14. The method of claim 8, wherein said data is received in two signal paths.

15. A system for reducing a carrier-to-noise ratio (C/N) in an orthogonal frequency division multiplexing (OFDM) receiver using diversity combining techniques in the presence of inter-carrier-interference (ICI), said system comprising:
    at least one hardware storage device operatively connected to the receiver that stores data from at least two channels;
    a first diversity combining equalizer that performs a first diversity combining equalization for said data;
    an estimator that estimates said data received from said first diversity combining equalizer;
    means for calculating ICI estimates for said data received from said estimator;
    means for calculating ICI terms by subtracting said data, received at said receiver from said at least two channels, from the calculated ICI estimates for said data to generate respective ICI subtracted data; and
    a second diversity combining equalizer that performs a second diversity combining equalization of said respective ICI subtracted data.

16. The system of claim 15, wherein said diversity combining techniques comprises maximal ratio combining (MRC).

17. The system of claim 15, wherein said second diversity combining equalization provides a gain of 2-4 dB for an Additive White Gaussian Noise (AWGN) channel with Quadrature Phase Shift Keying (QPSK) modulation.

18. The system of claim 15, wherein said second diversity combining equalization provides a gain of 2-4 dB for an Additive White Gaussian Noise (AWGN) channel with 16-Quadrature Amplitude Modulation (16-QAM).

19. The system of claim 15, wherein said second diversity combining equalization provides a gain of 5.5-8 dB for a six path Typical Urban (TU6) Doppler channel with a 50 Hz Doppler frequency and 16-Quadrature Amplitude Modulation (16-QAM).

20. The system of claim 15, wherein said means for calculating ICI estimates comprises a pair of ICI estimators.

* * * * *